(12) United States Patent
Neubauer

(10) Patent No.: US 8,696,766 B2
(45) Date of Patent: Apr. 15, 2014

(54) AZOPYRIDONE DISPERSE DYES, THEIR PREPARATION AND USE

(75) Inventor: Stefan Neubauer, Köln (DE)

(73) Assignee: DyStar Colours Deutschland GmbH, Frankfurt am Main (DE)

( * ) Notice: Subject to any disclaimer, the term of this patent is extended or adjusted under 35 U.S.C. 154(b) by 0 days.

(21) Appl. No.: 12/934,079

(22) PCT Filed: Mar. 18, 2009

(86) PCT No.: PCT/EP2009/053174
§ 371 (c)(1),
(2), (4) Date: Oct. 22, 2010

(87) PCT Pub. No.: WO2009/118260
PCT Pub. Date: Oct. 1, 2009

(65) Prior Publication Data
US 2011/0030153 A1   Feb. 10, 2011

(30) Foreign Application Priority Data
Mar. 25, 2008   (DE) .......................... 10 2008 015 570

(51) Int. Cl.
*C09B 29/42*   (2006.01)

(52) U.S. Cl.
USPC .................... 8/677; 8/693; 534/772; 534/655

(58) Field of Classification Search
USPC ........................................................ 8/677
See application file for complete search history.

(56) References Cited

U.S. PATENT DOCUMENTS

| | | | |
|---|---|---|---|
| 4,140,684 A | 2/1979 | Burkhard et al. | |
| 6,723,835 B1 * | 4/2004 | Millard et al. | 534/772 |

FOREIGN PATENT DOCUMENTS

| | | |
|---|---|---|
| GB | 2300863 A | 11/1996 |
| JP | 61-019664 A | 1/1986 |
| PL | 129345 A1 | 2/1983 |
| WO | WO-2006/131530 A1 | 12/2006 |

* cited by examiner

*Primary Examiner* — Harold Pyon
*Assistant Examiner* — Katie L Hammer
(74) *Attorney, Agent, or Firm* — Novak Druce Connolly Bove + Quigg LLP

(57) ABSTRACT

A dye of the general formula (I)

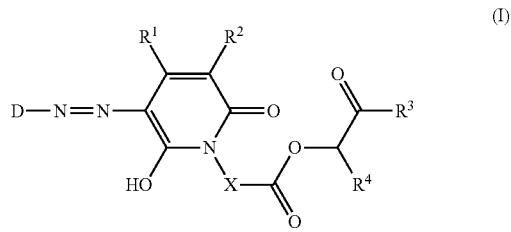

where
D is the residue of a diazo component;
X is $(C_1-C_6)$-alkylene or oxygen-interrupted $(C_2-C_6)$-alkylene;
$R^1$ is methyl, ethyl or phenyl;
$R^2$ is hydrogen, cyano or carboxamido;
$R^3$ is phenyl or substituted phenyl;
$R^4$ is hydrogen or methyl or
$R^3$ and $R^4$ combine with the atoms to which they are attached to form a five- or six-membered ring.

The invention further relates to the process of the preparation of the dye of formula and its use.

10 Claims, No Drawings

AZOPYRIDONE DISPERSE DYES, THEIR PREPARATION AND USE

CROSS-REFERENCE TO RELATED APPLICATIONS

This application is a national stage application (under 35 U.S.C. §371) of PCT/EP2009/053174, filed Mar. 18, 2009, which claims benefit of German application 10 2008 015 570.5, filed Mar. 25, 2008.

BACKGROUND OF THE INVENTION

The present invention relates to disperse azo dyes in which a phenacyl ester is linked to a pyridone coupler. Dyes comprising simple alkyl esters are already known and are described for example in JP 61019664 and PL 129345.

It has now been found that the disperse azo dyes of the present invention have outstanding properties and that dyeings prepared therewith are notable for good washfastnesses and outstanding sublimation fastnesses. More particularly, such dyeings meet the special requirements of industrial laundering, where textiles are exposed to high temperatures after the wash cycle.

BRIEF SUMMARY OF THE INVENTION

The present invention provides dyes of the general formula (I)

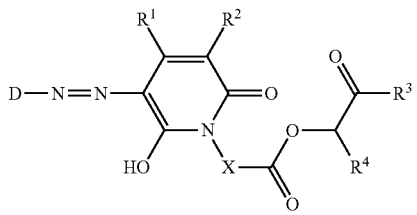

where
 D is the residue of a diazo component;
 X is $(C_1-C_6)$-alkylene or oxygen-interrupted $(C_2-C_6)$-alkylene;
 $R^1$ is methyl, ethyl or phenyl;
 $R^2$ is hydrogen, cyano or carboxamido;
 $R^3$ is phenyl or substituted phenyl;
 $R^4$ is hydrogen or methyl or
 $R^3$ and $R^4$ combine with the atoms to which they are attached to form a five- or six-membered ring.

DETAILED DESCRIPTION OF THE INVENTION

Residues D of a diazo component are in particular the residues customary in the field of disperse dyes and known to one skilled in the art.

Preferably, D
represents a group of the general formula (IIa)

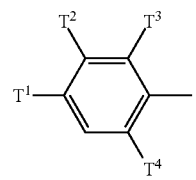

where
 $T^1$, $T^2$ and $T^3$ are independently hydrogen, halogen, —SCN, hydroxyl, $(C_1-C_4)$-alkyl, $(C_1-C_6)$-alkoxy, substituted $(C_1-C_6)$-alkoxy, phenoxy, cyano, —SO$_2$($C_1$-$C_6$)-alkyl, —OSO$_2$($C_1$-$C_6$)-alkyl, —SO$_2$aryl, —OSO$_2$aryl, —OCO($C_1$-$C_6$)-alkyl, —OCOaryl, —OCO$_2$($C_1$-$C_6$-alkyl), —OCO$_2$aryl, —CO$_2$($C_1$-$C_8$-alkyl), —CO$_2$($C_1$-$C_8$)-alkyl where the alkyl radical is substituted, —CO$_2$($C_1$-$C_8$)-alkyl where the alkyl radical is oxygen interrupted, —CO$_2$($C_1$-$C_8$)-alkyl where the alkyl radical is oxygen interrupted and substituted, —CO$_2$aryl, —NHCO($C_1$-$C_8$-alkyl), —NHCO($C_1$-$C_8$)-alkyl where the alkyl radical is oxygen interrupted, —CONH($C_1$-$C_8$-alkyl), —CONH($C_1$-$C_8$)-alkyl where the alkyl radical is oxygen interrupted, —NHSO$_2$($C_1$-$C_8$-alkyl), —SO$_2$NH($C_1$-$C_8$-alkyl), trifluoromethyl, trifluoromethylsulfonyl, trifluoromethoxy or nitro; and
 $T^4$ independently of $T^1$ to $T^3$ is hydrogen, hydroxyl, halogen, trifluoromethyl, cyano, —SO$_2$CH$_3$, —SCN or nitro;
or represents a group of the general formula (IIb)

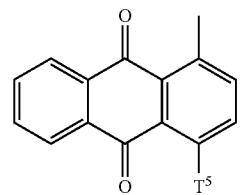

where $T^5$ is hydrogen or bromine;
or represents a group of the formula (IIc)

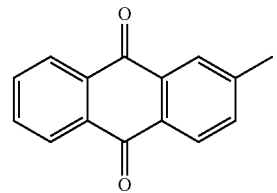

$(C_1-C_6)$-Alkyl groups may be straight chain or branched and are for example methyl, ethyl, n-propyl, i-propyl, n-butyl, i-butyl, tert-butyl, n-pentyl or n-hexyl. $(C_1-C_8)$-Alkyl groups may also be for example n-heptyl or n-octyl. Analogous considerations apply to alkoxy groups which are methoxy or ethoxy for example. $(C_2-C_6)$-Alkylene groups may be straight chain or branched and are for example ethylene, propylene, butylene, i-propylene or i-butylene. $(C_1-C_6)$-Alkylene groups may additionally be methylene. Oxygen-interrupted $(C_2-C_6)$-alkylene has for example the formula —(CH$_2$)$_n$—O—(CH$_2$)$_m$—where n and m are each from 1 to 5 and n+m is from 2 to 6.

Oxygen-interrupted $(C_2-C_6)$-alkyl has for example the formula —$(CH_2)_p$—O—$(CH_2)_q$—$CH_3$, where p is from 1 to 5 and q is from 0 to 4 and n+m is from 2 to 6.

Substituted $(C_1-C_6)$-alkoxy or alkyl $T^1$, $T^2$ or $T^3$ is substituted in particular by phenyl, phenoxy, acetyloxy, benzoyloxy or cyano.

Halogen is in particular fluorine, chlorine or bromine.

Aryl is in particular phenyl or naphthyl.

Substituted phenyl $R^3$ bears in particular 1 to 3 substituents selected independently from the group consisting of fluorine, chlorine, bromine, methyl, ethyl, phenyl, hydroxyl, methoxy, ethoxy, phenoxy, nitro, cyano, methylsulfonyl and trifluoromethyl.

Indanone or α-tetralone is an example of a five- or six-membered ring formed by $R^3$ and $R^4$ combining with the atoms to which they are attached.

X is preferably methylene, ethylene, propylene, butylene or pentylene;
$R^1$ is preferably methyl;
$R^2$ is preferably cyano;
$R^3$ is preferably phenyl, 4-chlorophenyl or 4-methoxyphenyl; and more preferably phenyl.
$R^4$ is preferably hydrogen.

Preferred dyes of the present invention conform to the general formula (Ia)

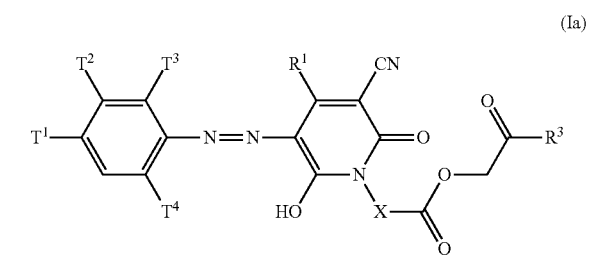

where $T^1$ to $T^4$, $R^1$, $R^3$ and X are each as defined above.

Particularly preferred dyes of this type according to the present invention conform to the general formula (Iaa)

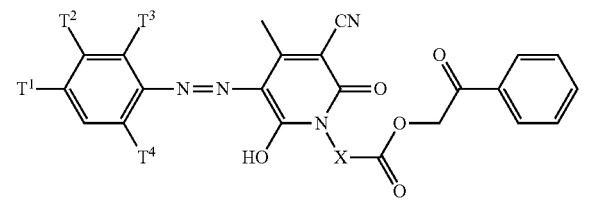

where
$T^1$, $T^2$ and $T^3$ are independently hydrogen, nitro, methyl, methoxy, ethoxy, propoxy, phenoxy, hydroxyl, cyano, chloro, trifluoromethyl, bromine, methyl, ethyl, methylsulfonyl, ethylsulfonyl, phenylsulfonyl, methylsulfonyloxy, ethylsulfonyloxy, phenylsulfonyloxy, —$CO_2(C_1-C_8$-alkyl), —$CO_2(C_1-C_8)$-alkyl where the alkyl radical is substituted, —$CO_2(C_1-C_8)$-alkyl where the alkyl radical is oxygen interrupted, —$CO_2(C_1-C_8)$-alkyl where the alkyl radical is oxygen interrupted and substituted, substituted $(C_1-C_8$-(oxygen-interrupted alkyl))oxycarbonyl or $(C_1-C_8$-alkylamino)carbonyl, $(C_1-C_8$-alkylamino)sulfonyl;

$T^4$ is hydrogen, cyano, nitro, chlorine, bromine, or trifluoromethyl;
X is methylene, ethylene, propylene, butylene or pentylene.

Further preferred dyes of the present invention conform to the general formula (Ib)

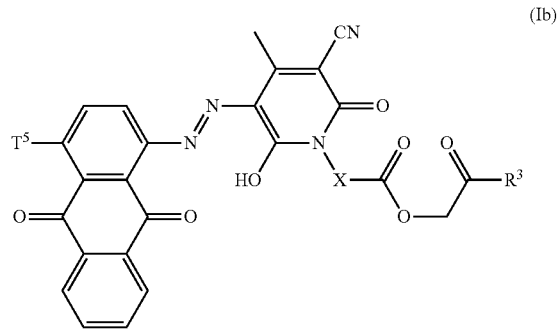

where $R^3$, $T^5$ and X are each as defined above.

Further preferred dyes of the present invention conform to the general formula (Ic)

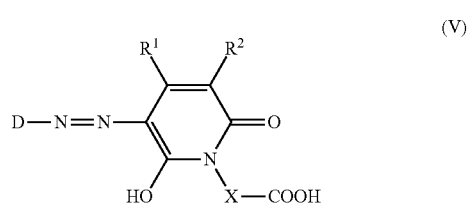

where $R^3$ and X are each as defined above.

The dyes of the general formula (I) according to the present invention can be prepared by methods known to one skilled in the art.

For instance, a compound of the general formula (V)

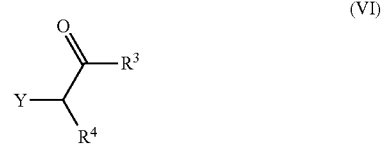

where $R^1$, $R^2$, D and X are each as defined above, is reacted with a haloketone of the general formula (VI)

(VI)

where Y is chlorine or bromine and $R^3$ and $R^4$ are each as defined above.

The reaction advantageously takes place in organic solvents, water or organic aqueous media in the presence of inorganic or organic bases at temperatures of 20 to 120° C., preferably at temperatures of 50 to 100° C.

The compounds of the general formula (V) and (VI) are known and can be prepared by known methods.

The dyes of the general formula (I) according to the present invention are outstandingly useful for dyeing and printing hydrophobic materials in that the dyeings and prints obtained are notable for level shades and high service fastnesses.

Deserving of emphasis are good washfastnesses, in particular those in combination with very good sublimation fastnesses.

It has further been determined that the disperse dyes of the present invention are outstandingly useful for the continuous dyeing of polyester-cotton blends as used for workwear for example. The wetfastnesses achieved, in particular according to the "Hoechst combination test" which is particularly relevant for this application and wherein the dyed material is exposed to temperatures of 190° C. for 5 minutes before the ISO 105-C05 test, are outstanding.

The present invention thus also provides for the use of the dyes of the general formula I for dyeing and printing hydrophobic materials, and processes for dyeing or printing such materials in conventional procedures which utilize as colorants one or more dyes of the general formula (I) according to the present invention.

The hydrophobic materials mentioned can be of synthetic or cellulosic origin. Hydrophobic materials contemplated include for example secondary cellulose acetate, cellulose triacetate, polyamides, polylactides and, in particular, macromolecular polyesters. Materials composed of macromolecular polyester are in particular those based on polyethylene terephthalates or polytrimethylene terephthalates. Also contemplated are blend fabrics and fiber blends such as for example polyester-cotton or polyester-elastane. The hydrophobic synthetic materials may be in the form of sheet- or thread-shaped structures and may have been processed for example into yarns or woven or knit textile fabrics. Preference is given to fibrous textile materials, which can also be present in the form of microfibers for example.

The dyeing in accordance with the use according to the present invention can be effected in a conventional manner, preferably from an aqueous dispersion, if appropriate in the presence of carriers, between 80 to about 110° C. by the exhaust method or by the HT method in a dyeing autoclave at 110 to 140° C., and also by the so-called thermofix method in which the fabric is padded with the dyeing liquor and subsequently fixed/set at about 180 to 230° C.

Printing of the materials mentioned can be carried out in a manner known per se by incorporating the dyes of the general formula (I) of the present invention in a print paste and treating the fabric printed therewith at temperatures between 180 to 230° C. with HT steam, high-pressure steam or dry heat, if appropriate in the presence of a carrier, to fix the dye.

The dyes of the general formula (I) of the present invention shall be in a very fine state of subdivision when they are used in dyeing liquors, padding liquors or print pastes.

The dyes are converted into the fine state of subdivision in a conventional manner by slurrying the as-fabricated dye together with dispersants in a liquid medium, preferably in water, and subjecting the mixture to the action of shearing forces to mechanically comminute the original dye particles to such an extent that an optimal specific surface area is achieved and sedimentation of the dye is minimized. This is accomplished in suitable mills, such as ball or sand mills. The particle size of the dyes is generally between 0.5 and 5 μm and preferably equal to about 1 μm.

The dispersants used in the milling operation can be nonionic or anionic. Nonionic dispersants include for example reaction products of alkylene oxides, for example ethylene oxide or propylene oxide, with alkylatable compounds, for example fatty alcohols, fatty amines, fatty acids, phenols, alkylphenols and carboxamides. Anionic dispersants are for example lignosulfonates, alkyl- or alkylarylsulfonates or alkylaryl polyglycol ether sulfates.

The dye preparations thus obtained shall be pourable for most applications. Accordingly, the dye and dispersant content is limited in these cases. In general, the dispersions are adjusted to a dye content up to 50 percent by weight and a dispersant content up to about 25 percent by weight. For economic reasons, dye contents are in most cases not below 15 percent by weight.

The dispersions may also contain still further auxiliaries, for example those which act as oxidizing agents, for example sodium m-nitrobenzenesulfonate, or fungicidal agents, for example sodium o-phenylphenoxide and sodium pentachlorophenoxide, and particularly so-called "acid donors", examples being butyrolactone, monochloroacetamide, sodium chloroacetate, sodium dichloroacetate, the sodium salt of 3-chloropropionic acid, monosulfate esters such as lauryl sulfate for example, and also sulfuric esters of ethoxylated and propoxylated alcohols, for example butylglycol sulfate.

The dye dispersions thus obtained are very advantageous for making up dyeing liquors and print pastes.

There are certain fields of use where powder formulations are preferred. These powders comprise the dye, dispersants and other auxiliaries, for example wetting, oxidizing, preserving and dustproofing agents and the abovementioned "acid donors".

A preferred method of making pulverulent preparations of dye consists in stripping the above-described liquid dye dispersions of their liquid, for example by vacuum drying, freeze drying, by drying on drum dryers, but preferably by spray drying.

The dyeing liquors are made by diluting the requisite amounts of the above-described dye formulations with the dyeing medium, preferably water, such that a liquor ratio of 5:1 to 50:1 is obtained for dyeing. In addition, it is generally customary to include further dyeing auxiliaries, such as dispersing, wetting and fixing auxiliaries, in the liquors. Organic and inorganic acids such as acetic acid, succinic acid, boric acid or phosphoric acid are included to set a pH in the range from 4 to 5, preferably 4.5. It is advantageous to buffer the pH setting and to add a sufficient amount of a buffering system. The acetic acid/sodium acetate system is an example of an advantageous buffering system.

To use the dye or dye mixture in textile printing, the requisite amounts of the abovementioned dye formulations are kneaded in a conventional manner together with thickeners, for example alkali metal alginates or the like, and if appropriate further additives, for example fixation accelerants, wetting agents and oxidizing agents, to give print pastes.

The present invention also provides inks for digital textile printing by the ink jet process, comprising a present invention dye of the general formula (I).

The inks of the present invention are preferably aqueous and comprise one or more of the present invention's dyes of the general formula (I), for example in amounts of 0.1% to 50% by weight, preferably in amounts of 1% to 30% by weight and more preferably in amounts of 1% to 15% by weight based on the total weight of the ink. They further comprise in particular from 0.1% to 20% by weight of a dispersant. Suitable dispersants are known to one skilled in the art, are commercially available and include for example sulfonated or sulfomethylated lignins, condensation products of aromatic sulfonic acids and formaldehyde, condensation products of substituted or unsubstituted phenol and formaldehyde, polyacrylates and corresponding copolymers, modified polyurethanes and reaction products of alkylene oxides with alkylatable compounds, for example fatty alcohols, fatty amines, fatty acids, carboxamides and substituted or unsubstituted phenols.

The inks of the present invention may further comprise customary additives, for example viscosity moderators to set viscosities in the range from 1.5 to 40.0 mPas in a temperature range of 20 to 50° C. Preferred inks have a viscosity in the range from 1.5 to 20 mPas and particularly preferred inks have a viscosity in the range from 1.5 to 15 mPas.

Useful viscosity moderators include rheological additives, for example polyvinyl-caprolactam, polyvinylpyrrolidone and also their copolymers, polyetherpolyol, associative thickeners, polyureas, sodium alginates, modified galactomannans, polyetherurea, polyurethane and nonionic cellulose ethers.

By way of further additives, the inks of the present invention may include surface-active substances to set surface tensions in the range from 20 to 65 mN/m, which are if appropriate adapted depending on the process used (thermal or piezo technology).

Useful surface-active substances include for example surfactants of any kind, preferably nonionic surfactants, butyldiglycol and 1,2 hexanediol.

The inks may further include customary additives, for example chemical species to inhibit fungal and bacterial growth in amounts from 0.01% to 1% by weight based on the total weight of the ink.

The inks of the present invention can be prepared in conventional manner by mixing the components in water.

Example 1

32.0 g of 4-[3-cyano-6-hydroxy-5-(4-methoxy-2-nitrophenylazo)-4-methyl-2-oxo-2H-pyridin-1-yl]butyric acid are stirred in 250 mL of acetone together with 10.8 g of potassium carbonate and 17.2 g of phenacyl bromide at 50° C. for 5 hours. The mixture is cooled to room temperature and 1250 mL of water are added dropwise. The batch is filtered and the filter residue is washed with water and dried in vacuum to leave 38.3 g of the dye of the formula (Iab)

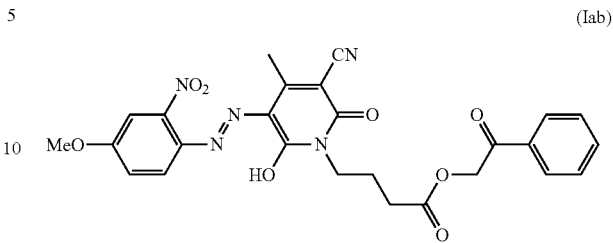

(Iab)

($\lambda_{max}$ [DMF]=474 nm) which produces golden yellow shades having good washfastnesses and sublimation fastnesses on polyester.

Example 2

14.3 g of [3-cyano-5-(3,4-dichlorophenylazo)-6-hydroxy-4-methyl-2-oxo-2H-pyridin-1-yl]acetic acid are stirred in 100 mL of acetone together with 5.3 g of sodium carbonate and 10.0 g of phenacyl bromide at 50° C. for 4 hours. The mixture is cooled to room temperature and 500 mL of water added dropwise. The resulting precipitate is filtered off and washed with water to leave 16.4 g of the dye of the formula (Iac)

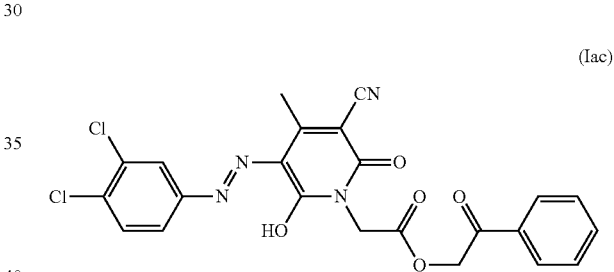

(Iac)

($\lambda_{max}$ [DMF]=432 nm) which produces greenish yellow shades having good washfastnesses and excellent sublimation fastnesses on polyester.

Examples 3 to 31 of Table 1 Were Prepared Similarly.

TABLE 1

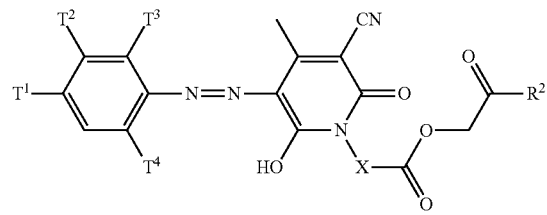

| Example | $T^1$ | $T^2$ | $T^3$ | $T^4$ | $R^2$ | X | $\lambda_{max}$ (nm) DMF |
|---|---|---|---|---|---|---|---|
| 3 | OCH$_3$ | H | H | NO$_2$ | Phenyl | —CH$_2$— | 474 |
| 4 | OCH$_3$ | H | H | NO$_2$ | Phenyl | —CH$_2$CH$_2$— | 474 |
| 5 | OCH$_3$ | H | H | NO$_2$ | Phenyl | —CH$_2$CH$_2$CH$_2$CH$_2$— | 474 |
| 6 | OCH$_3$ | H | H | NO$_2$ | Phenyl | —CH$_2$CH$_2$CH$_2$CH$_2$CH$_2$— | 474 |
| 7 | OCH$_3$ | H | H | NO$_2$ | 4-Methoxy-phenyl | —CH$_2$CH$_2$— | 474 |

TABLE 1-continued

[Structure: T¹,T²,T³,T⁴-substituted phenyl-N=N-pyridine with CN, methyl, OH, oxo groups, N-X-C(O)-O-CH2-C(O)-R²]

| Example | T¹ | T² | T³ | T⁴ | R² | X | $\lambda_{max}$ (nm) DMF |
|---|---|---|---|---|---|---|---|
| 8 | OCH₃ | H | H | NO₂ | 4-Chlorophenyl | —CH₂CH₂— | 474 |
| 9 | H | NO₂ | H | H | Phenyl | —CH₂— | 424 |
| 10 | NO₂ | H | H | CF₃ | Phenyl | —CH₂CH₂CH₂— | 426 |
| 11 | NO₂ | H | H | CF₃ | Phenyl | —CH₂— | 426 |
| 12 | Cl | Cl | H | H | Phenyl | —CH₂CH₂— | 432 |
| 13 | Cl | Cl | H | H | Phenyl | —CH₂CH₂CH₂— | 432 |
| 14 | NO₂ | H | H | H | Phenyl | —CH₂CH₂CH₂— | 436 |
| 15 | H | NO₂ | H | H | Phenyl | —CH₂CH₂CH₂— | 424 |
| 16 | H | H | NO₂ | H | Phenyl | —CH₂CH₂CH₂— | 442 |
| 17 | NO₂ | H | H | Cl | Phenyl | —CH₂CH₂CH₂— | 436 |
| 18 | Cl | H | NO₂ | H | Phenyl | —CH₂CH₂CH₂— | 446 |
| 19 | NO₂ | H | OCH₃ | H | Phenyl | —CH₂CH₂CH₂— | 448 |
| 20 | OCH₃ | H | OCH₃ | H | Phenyl | —CH₂CH₂CH₂— | 484 |
| 21 | COOCH₃ | H | H | H | Phenyl | —CH₂CH₂CH₂— | 432 |
| 22 | COOCH₂CH₃ | H | H | H | Phenyl | —CH₂CH₂CH₂— | 432 |
| 23 | NO₂ | H | H | H | Phenyl | —CH₂CH₂— | 436 |
| 24 | H | NO₂ | H | H | Phenyl | —CH₂CH₂— | 424 |
| 25 | H | H | NO₂ | H | Phenyl | —CH₂CH₂— | 442 |
| 26 | NO₂ | H | H | Cl | Phenyl | —CH₂CH₂— | 436 |
| 27 | Cl | H | NO₂ | H | Phenyl | —CH₂CH₂— | 446 |
| 28 | NO₂ | H | OCH₃ | H | Phenyl | —CH₂CH₂— | 448 |
| 29 | OCH₃ | H | OCH₃ | H | Phenyl | —CH₂CH₂— | 484 |
| 30 | COOCH₃ | H | H | H | Phenyl | —CH₂CH₂— | 432 |
| 31 | COOCH₂CH₃ | H | H | H | Phenyl | —CH₂CH₂— | 432 |

Example 32

11.8 g of 4-[3-cyano-5-(9,10-dioxo-9,10-dihydroanthracen-1-ylazo)-6-hydroxy-4-methyl-2-oxo-2H-pyridin-1-yl] butyric acid are stirred in 70 mL of dimethylformamide together with 2.7 g of sodium carbonate and 5.0 g of phenacyl bromide at 60° C. for 7 hours. The mixture is cooled to room temperature, and the precipitate is filtered off and washed with a little dimethylformamide. The crude product is suspended in 200 ml of water, filtered off again, washed with water and dried in vacuum to leave 4.0 g of dye of the formula (Ica)

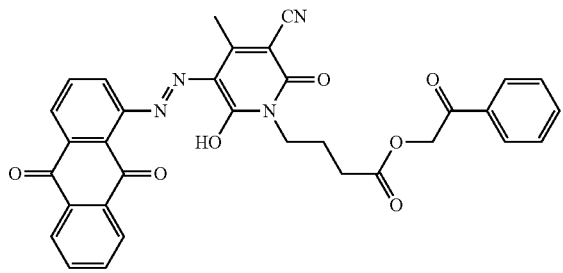

(Ica)

($\lambda_{max}$ [DMF]=462 nm) which dyes polyester yellow and has very good wash-, sublimation and lightfastness.

Example 33

A textile fabric consisting of polyester is padded with a liquor consisting of 50 g/l of 8% sodium alginate solution, 100 g/l of 8-12% carob flour ether solution and 5 g/l of monosodium phosphate in water and then dried. The wet pickup is 70%. The textile thus pretreated is then printed with an aqueous ink prepared in accordance with the procedure described above and containing 3.5% of the dye of Example 1, 2.5% of Disperbyk 190 dispersant, 30% of 1,5-pentanediol, 5% of diethylene glycol monomethyl ether, 0.01% of Mergal K9N biocide, and 58.99% of water using a drop-on-demand (piezo) ink jet print head. The print is fully dried. Fixing is effected by means of superheated steam at 175° C. for 7 minutes. The print is subsequently subjected to an alkaline reduction clear, rinsed warm and then dried.

What is claimed is:

1. A dye of the general formula (I)

where
- D is the residue of a diazo component;
- X is $(C_1-C_6)$-alkylene or oxygen-interrupted $(C_2-C_6)$-alkylene;
- $R^1$ is methyl, ethyl or phenyl;
- $R^2$ is hydrogen, cyano or carboxamido;
- $R^3$ is phenyl or substituted phenyl;
- $R^4$ is hydrogen or methyl or $R^3$ and $R^4$ combine with the atoms to which they are attached to form a five- or six-membered ring.

2. The dye as claimed in claim 1 wherein D represents a group of the general formula (IIa)

where
- $T^1$, $T^2$ and $T^3$ are independently hydrogen, halogen, —SCN, hydroxyl, $(C_1-C_4)$-alkyl, $(C_1-C_6)$-alkoxy, substituted $(C_1-C_6)$-alkoxy, phenoxy, cyano, —SO$_2$($C_1$-$C_6$)-alkyl, —OSO$_2$($C_1$-$C_6$)-alkyl, —SO$_2$aryl, —OSO$_2$aryl, —OCO($C_1$-$C_6$)-alkyl, —OCOaryl, —OCO$_2$($C_1$-$C_6$-alkyl), —OCO$_2$aryl, —CO$_2$($C_1$-$C_8$-alkyl), —CO$_2$($C_1$-$C_8$)-alkyl where the alkyl radical is substituted, —CO$_2$($C_1$-$C_8$)-alkyl where the alkyl radical is oxygen interrupted, —CO$_2$($C_1$-$C_8$)-alkyl where the alkyl radical is oxygen interrupted and substituted, —CO$_2$aryl, —NHCO($C_1$-$C_8$-alkyl), —NHCO($C_1$-$C_8$)-alkyl where the alkyl radical is oxygen interrupted, —CONH($C_1$-$C_8$-alkyl), —CONH($C_1$-$C_8$)-alkyl where the alkyl radical is oxygen interrupted, —NHSO$_2$($C_1$-$C_8$-alkyl), —SO$_2$NH($C_1$-$C_8$-alkyl), trifluoromethyl, trifluoromethylsulfonyl, trifluoromethoxy or nitro; and
- $T^4$ independently of $T^1$ to $T^3$ is hydrogen, hydroxyl, halogen, trifluoromethyl, cyano, —SO$_2$CH$_3$, —SCN or nitro;

or represents a group of the general formula (IIb)

where $T^5$ is hydrogen or bromine;

or represents a group of the formula (IIc)

3. The dye as claimed in claim 1, wherein
- X is methylene, ethylene, propylene, butylene or pentylene;
- $R^1$ is methyl;
- $R^2$ is cyano;
- $R^3$ is phenyl, 4-chlorophenyl or 4-methoxyphenyl; and
- $R^4$ is hydrogen.

4. The dye as claimed in claim 2, wherein
- X is methylene, ethylene, propylene, butylene or pentylene;
- $R^1$ is methyl;
- $R^2$ is cyano;
- $R^3$ is phenyl, 4-chlorophenyl or 4-methoxyphenyl; and
- $R^4$ is hydrogen.

5. The dye as claimed in claim 2, conforming to the general formula (Ia)

where $T^1$ to $T^4$, $R^1$, $R^3$ and X are each as defined in claim 2.

6. The dye as claimed in claim 5, conforming to the general formula (Iaa)

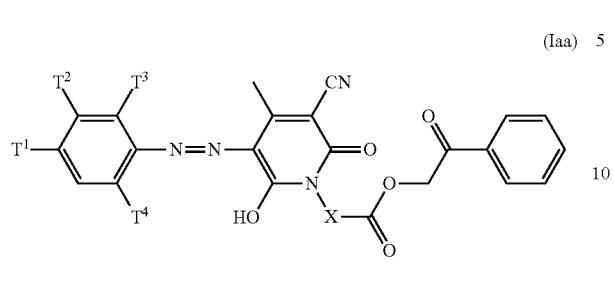

(Iaa)

where
T$^1$, T$^2$ and T$^3$ are independently hydrogen, nitro, methyl, methoxy, ethoxy, propoxy, phenoxy, hydroxyl, cyano, chloro, trifluoromethyl, bromine, methyl, ethyl, methylsulfonyl, ethylsulfonyl, phenylsulfonyl, methylsulfonyloxy, ethylsulfonyloxy, phenylsulfonyloxy, —CO$_2$(C$_1$-C$_8$-alkyl), —CO$_2$(C$_1$-C$_8$)-alkyl where the alkyl radical is substituted, —CO$_2$(C$_1$-C$_8$)-alkyl where the alkyl radical is oxygen interrupted, —CO$_2$(C$_1$-C$_8$)-alkyl where the alkyl radical is oxygen interrupted and substituted, substituted (C$_1$-C$_8$-(oxygen-interrupted alkyl))oxycarbonyl or (C$_1$-C$_8$-alkylamino)carbonyl, (C$_1$-C$_8$-alkylamino)sulfonyl;
T$^4$ is hydrogen, cyano, nitro, chlorine, bromine, or trifluoromethyl;
X is methylene, ethylene, propylene, butylene or pentylene.

7. The dye as claimed in claim 2 conforming to the general formula (Ib)

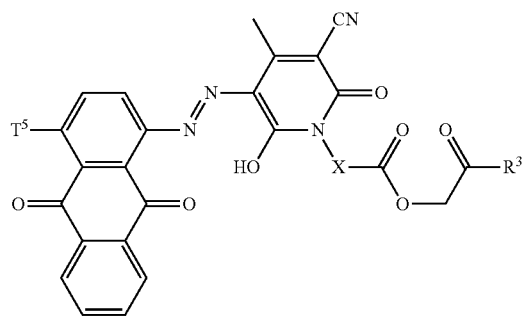

(Ib)

where
T$^5$ is hydrogen or bromine;
X is (C$_1$-C$_6$)-alkylene or oxygen-interrupted (C$_2$-C$_6$)-alkylene; and
R$^3$ is phenyl or substituted phenyl, or the general formula (Ic),

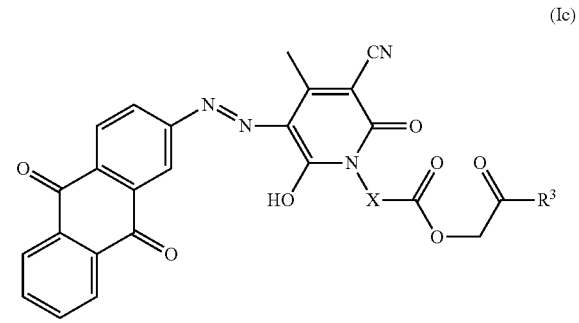

(Ic)

wherein
X is (C$_1$-C$_6$)-alkylene or oxygen-interrupted (C$_2$-C$_6$)-alkylene; and
R$^3$ is phenyl or substituted phenyl.

8. A process for preparing the dye of the general formula (I) as claimed in claim 1, which comprises reacting a compound of the general formula (V)

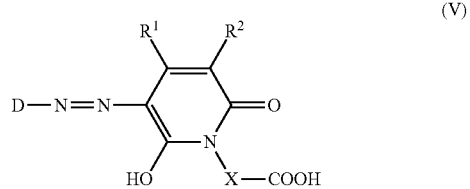

(V)

where R$^1$, R$^2$, D and X are each as defined in claim 1, with a haloketone of the general formula (VI)

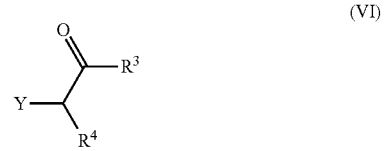

(VI)

where Y is chlorine or bromine and R$^3$ and R$^4$ are each as defined in claim 1.

9. A process for dyeing and printing a hydrophobic material which comprises contacting the material with the dye of the general formula (I) as claimed in claim 1.

10. An ink for digital textile printing by the ink jet process, comprising the dye of the general formula (I) as claimed in claim 1.

* * * * *

UNITED STATES PATENT AND TRADEMARK OFFICE
CERTIFICATE OF CORRECTION

PATENT NO.        : 8,696,766 B2
APPLICATION NO. : 12/934079
DATED             : April 15, 2014
INVENTOR(S)       : Stefan Neubauer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 182 days.

Signed and Sealed this
Twenty-ninth Day of September, 2015

Michelle K. Lee
*Director of the United States Patent and Trademark Office*